United States Patent [19]
Klemma

[11] Patent Number: 5,273,090
[45] Date of Patent: Dec. 28, 1993

[54] WOOD WORKING ASSEMBLY

[76] Inventor: Asle Klemma, 424 Pleasant Dr., Roselle, Ill. 60193

[21] Appl. No.: 28,340

[22] Filed: Mar. 9, 1993

[51] Int. Cl.$^5$ .......................... B27C 5/06; B25H 1/00
[52] U.S. Cl. .................................. 144/134 R; 83/574; 83/859; 144/134 D; 144/136 R; 144/137; 144/286 R; 409/182; 409/227
[58] Field of Search .................. 83/574, 468, 859; 144/1; 409/182, 227; 269/289, 309

[56] References Cited

U.S. PATENT DOCUMENTS

| | | | |
|---|---|---|---|
| 3,770,031 | 11/1973 | Olson | 144/136 R |
| 4,133,237 | 1/1979 | Lewin | 83/574 |
| 4,281,694 | 8/1981 | Gorman | 144/136 C |
| 4,995,288 | 2/1991 | DellaPolla | 83/574 |
| 5,165,317 | 11/1992 | Findlay | 83/574 |

Primary Examiner—W. Donald Bray
Attorney, Agent, or Firm—Richard R. Mybeck

[57] ABSTRACT

A wood working assembly for use in preparing and finishing wooden surfaces for shaping and joining wooden members with portable hand tools including a frame sub-assembly, tool support means, including means for supporting and directing a portable hand tool thereupon, and a work board sub-assembly operatively associated with the frame sub-assembly to support a work piece relative thereto and selectively position said work piece relative to the hand tool to shape, form and/or join the work piece therewith.

28 Claims, 3 Drawing Sheets

WOOD WORKING ASSEMBLY

INTRODUCTION

The present invention relates generally to a wood working assembly and more particularly to a device for securing wood pieces and guiding portable tools associated therewith to shape and join wooden members in a manner which may be practiced on the job site or in the shop to provide physical results heretofore unattainable.

BACKGROUND OF THE INVENTION

The preparation of wood surfaces for joinery by power tools has heretofore been severely limited by the currently available stationary joiners. This limitation posed several problems. First, the prior art joiners could not be moved to the work piece so that the work piece had to be moved to and over the stationary table which contained the cutting bit. This was true even when the work piece was large and/or heavy and/or extremely long. Long pieces of wood were particularly vexatious because they tended to bounce while being cut. If the work piece moves the wrong way while being cut, minimally the cut had to be redone but more often that not was ruined. Since joinery is usually practiced on finer, more expensive woods, such a loss is most significant relative to the total cost of the project. Furthermore, the shaping of large pieces frequently required the presence of a second person, or special supports, or both in order to obtain true cutting thereby adding further to the unit cost. The length of such work pieces was further limited by the space available in the quarters where the tool was located and the position of the joiner relative to nearby obstacles such as walls, columns and the like. The length of the work piece was frequently limited to a maximum of one-half the floor width surrounding the joiner thereby necessitating further joining where the desired length of the work piece exceeded the available space.

Safety is another major concern in the use of a presently available joiners. Frequently, the operator's hands were only inches away from the cutting blade and clearly at risk when required to press down on the work piece during the cutting operation to prevent the work piece from bouncing or slipping during the procedure.

Further, present day joiners generally can cut only 1/16th of an inch, or ⅛th of an inch at the most, in a single pass. Therefore, a deeper cut, such as a full 45 degree angle across the full work piece, may take several cuts, requiring several passes of the work piece.

Portable planers have provided a solution to some of these difficulties, but each create problems of their own. The portable planer moves over the work piece, unlike the stationary planer, thus eliminating some of the previous problems. The biggest disadvantage of the portable planer; however, is that it follows the contour of the surface of the work piece. If the work piece has any length and an uneven surface, the result is a wavy product which cannot be used, or has to be redone. Also, any movement other than a steady consistent movement of the portable planer can cause defects in the finished product.

The quality of the surface required for joinery has heretofore precluded the use of the conventional table saws and ordinary cutting tools in joiner operations.

The present invention is directed toward a novel and unique wood working assembly which obviates the prior art problems in a unique and cost efficient way and permits high quality joinery to be produced either in the workshop or on the building site.

BRIEF SUMMARY OF THE INVENTION

The present invention relates generally to a wood working assembly for use in preparing wooden surfaces for joining wooden members and more particularly to a device for shaping and joining wooden members which may be utilized either in the workshop or at the job site. As will appear, the assembly of the present invention permits the use of less costly portable power tools to obtain physical results, some of which heretofore have been achievable only on the more expensive stationary joiners and planers and others which have not been achievable at all.

More particularly, the present invention relates to a specially designed assembly having new and improved stand means for the support of wood pieces, and associated hand tool frames including means for precisely controlling the movement of the hand tools relative to the work piece. Each stand means includes parallel, level guide tracks for specially designed tool frame or jigs, workboard means for securing a work piece in a fixed position relative to the tracks and hence the associated tool, while the work piece is being cut and/or shaped, and interchangeable tool frames or jigs, each of which is adapted to traverse the guide rails in a controllable position relative to the work piece. The interchangeable tool jigs include a planer frame for holding a planer securely at a plurality of exact angles to guide it precisely while it cuts, and a router frame adapted to hold a router securely in a plurality of exact angles relative to the work piece to guide the router precisely while it cuts.

The workboard means comprises a backboard, a ledge, clamping means operatively associated with the ledge, to secure the ledge to the backboard for relative movement thereto and securing means for attaching the work piece to the board and securing the board while the board is being cut and or shaped. The ledge of the work board is counter-balanced making the set-up almost effortless. Large pieces are handled in sections each equal to the length of the assembly thereby freeing the operator from limitations on work piece length. If a piece of wood is longer than the device, one section is processed and the work piece is then advanced one cutting length, and the process is repeated until the entire length is cut. Fewer pieces of wood are damaged and lost than by the prior art methods.

Another important aspect of the present invention involves the interchangeable tool holders or jigs, one which is especially adapted to hold a portable planer and the other, a portable router. Both sit upon and traverse the guide tracks to guide the selected tool accurately across the work piece so that most desired cuts can be made in a single pass. Angle cuts may be made with either the portable planer or router using the jig of the present invention. In all instances, the operator's hands are safely on top of the power tool and well away from the blade.

Further, use of the present assembly enables the ready preparation and production of elongated work pieces having perfectly parallel edges, a feat not easily performed on current dry joiners.

Accordingly, a primary object of the present invention is to provide a novel and unique wood working assembly that enables the operator thereof to use less expensive portable tools and avoid the work piece restrictions inherent in the permanent workshop.

Another object of the present invention is to proved an new and improved wood working assembly which accommodates and guides small portable power tools relative to a selected work piece secured thereto in a manner which substantially eliminates the difficulties and dangers associated with handling such work pieces in the workshop while providing a full gamut of cuts, angles and shapes for the workpiece.

A still further object of the present invention is to provide an improved wood working assembly which achieves enhanced operator safety by allowing the operators' hands to be removed from the vicinity of the cutter blades of the power tool being used.

Another object of the present invention to provide an improved word working assembly which allows the cost-effective production of joined wooden work pieces in shapes and sizes and with a degree of accuracy heretofore unobtainable using conventional tooling.

These and still further objects as shall hereinafter appear are readily fulfilled by the present invention in a remarkably unexpected manner as will be readily discerned from the following detailed description of an exemplary embodiment thereof especially when read in conjunction with the accompanying drawing in which like parts bear like numerals throughout the several views.

DESCRIPTION OF THE PREFERRED EMBODIMENT

The present invention relates generally to means and methods for shaping selected wood surfaces and/or preparing, wood surfaces for joining. More particularly the present such invention provides a novel and unique wood working assembly identified in the accompanying drawing by the general reference 10.

Figure 1:
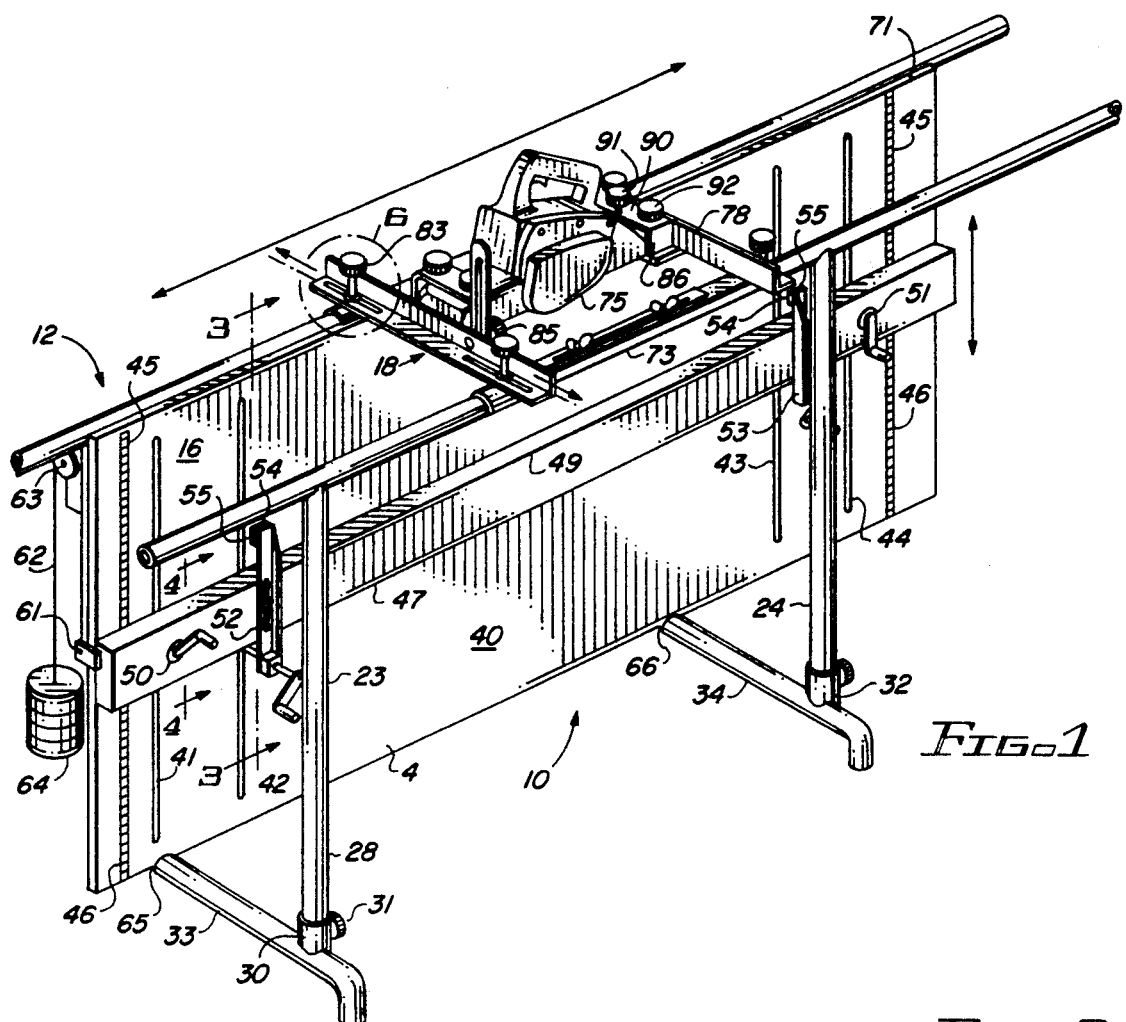
FIG. 1 is a perspective view of a woodworking assembly embodying the present invention.

As shown in FIG. 1, wood working assembly 10 comprises a frame sub-assembly 12, a workboard sub assembly 14 operatively associated with frame sub-assembly 12 and coactive therewith to secure and maintain a work piece 16 in a preselected location relative thereto. Tool support means 18 is mounted upon frame sub-assembly 12 for traverse movement longitudinally thereof, as will be hereinafter described in detail, to transport a suitable wood working tool such as an electric planer 20 therewith for operative engagement with work piece 16 to accomplish the desired shaping or forming thereof. As will further appear, various wood working tools 20 can be mounted in tool support means or "jig" 18 for movement along frame sub-assembly 12 to perform any number of preselected tasks on the work piece 16. The entire operation can be accomplished at any site where appropriate power for the tool is available either as conventional power lines, portable battery packs or generators and the like.

As shown in FIGS. 1, 2, 3, 5 and 10, frame sub-assembly 12 comprises a first rail member 21 and a second rail member, 22 disposed in spaced parallel coplaner relationship to each other. Each rail for example, rail 21 is seated upon and suitable secured to the upper end of a first and second vertical pipe support or leg member 23, 24 which are disposed in spaced generally parallel relationship to each other intermediate the ends of rail 21 and perpendicular thereto. Leg members 25, 26 are similarly positioned relative to rail member 22 and depend orthogonally therefrom intermediate the ends thereof. The lower end 28 each leg, for example leg 23 is telescopically inserted into and fits within a base stem 30 and is secured thereto by a suitable fastener such as bolt 31 which is threaded through base stem 30 for securing engagement with vertical support 23. Base stem 30 is supported by and extends upwardly from traverse foot member 33. A like base stem (not shown) is mounted on the distal end of foot member 33 to receive and secure vertical extending support pipe 25 to support one end of rail member 22.

A second foot member 34 similarly supports the distal ends of rails 21, 22 by means of support pipes 24, 26 which depend therefrom, respectively, for telescopic insertion into and attachment by basestems 32 (one not shown) which in turn are attached to and supported by second transverse foot member 34.

Rail 22 is supported by the same structure as that which has been already described relative to rail 21. In this fashion rails 21 and 22 are secured in spaced parallel coplanar relationship to each other and in spaced orthogonal relationship to foot members 33, 34.

In one practice of the present invention, frame sub-assembly 12 is assembled by placing foot members 33, 34 in spaced parallel relationship to each other so that base stem 30 and its several counterparts face upwardly. Next, vertical pipes 23, 24, 25 and 26 are respectively inserted into their corresponding base stem 30, 32 and the corresponding base stems (not shown) to the rear on foot members 33, 34 and secured in place.

Rails 21, 22 are then mounted on and secured to the to the upper ends of legs 23, 24, 25 and 26, which ends can be contoured to provide a concave upwardly facing surface 36 when round rails are employed for receiving and holding a portion of the corresponding rail member 21, 22 therewithin. Thus assembled, rail members 21, 22 are disposed in spaced parallel coplanar relationship to each other and extend in spaced orthogonal relationship to foot members 33, 34. The frame subassembly 12, assembled as described is now ready to receive work board sub-assembly 14.

Figure 3:
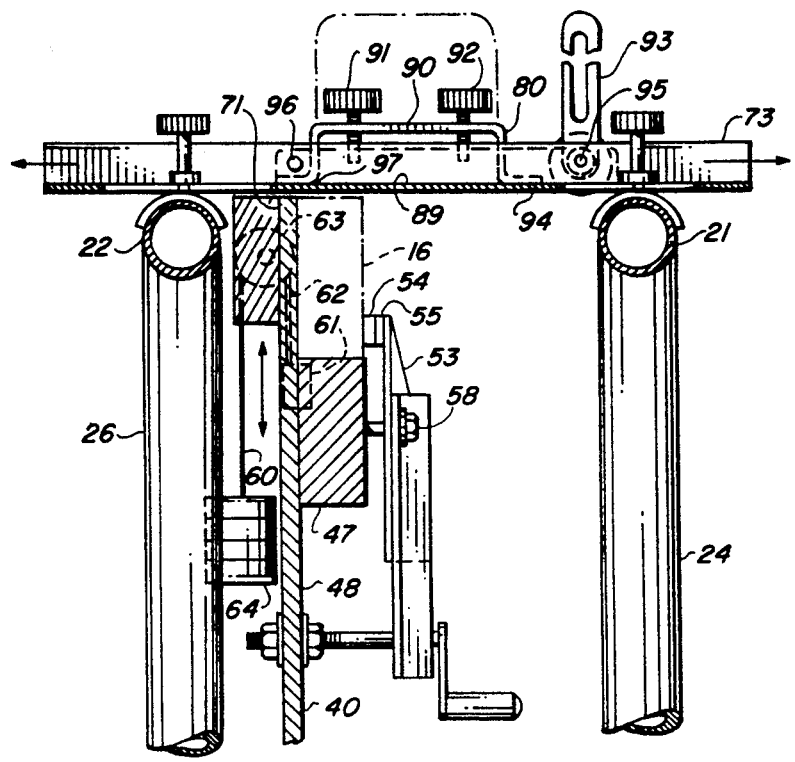
FIG. 3 is a cross-section taken on lines 3—3 in FIG. 1.
Figure 4:
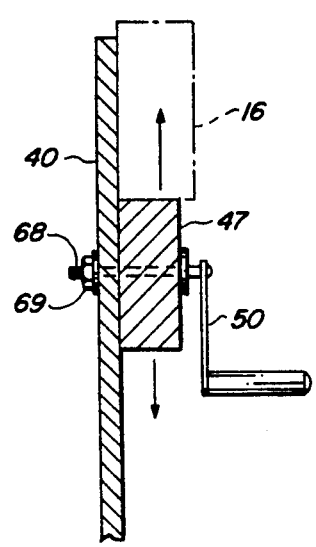
FIG. 4 is a cross-section taken on lines 4—4 of FIG. 1.
Figure 5:
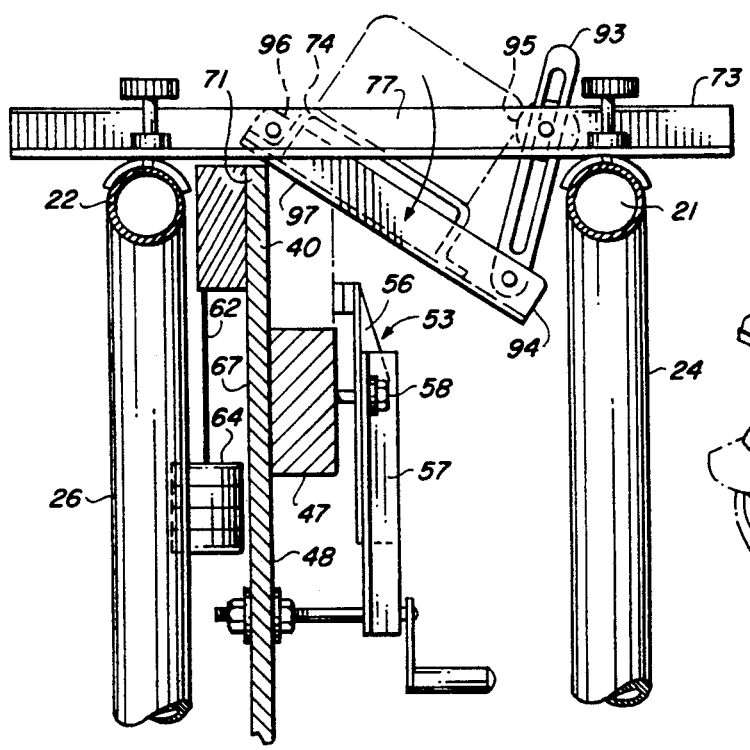
FIG. 5 is an end view, partially broken away, of the woodworking assembly of FIG. 1 when the power tool, is disposed at an angle relative to the work piece.
Figure 6:
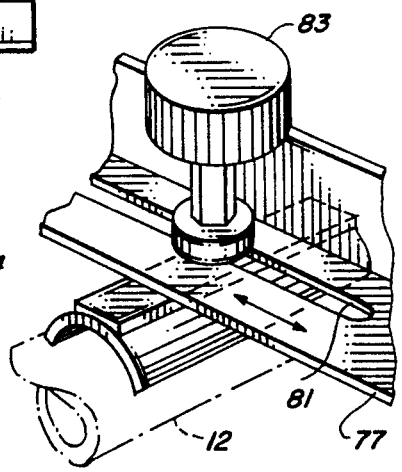
FIG. 6 is a perspective showing, of a portion of the woodworking assembly of FIG. 1.

As shown in FIGS. 1, 3, 4 and 5, workboard sub-assembly 14 comprises generally a rectangular body member 40 having a plurality of spaced generally parallel vertical slots 41, 42, 43 and 44 defined therein for a purpose to be described. Suitable vertically extending channels 45, 46 are disposed adjacent each edge of body member 40 to receive and hold a suitable graduated scale therein. Work support member 47 is disposed in surface-to-surface engagement with the adjacent surface 48 of body member 40 and secured thereto by suitable adjustable locking devices 50, 51 which extend through slots 41, 44 respectively. Slots 42, 43, which are disposed inwardly of slots 41, 44, and parallel thereto, and are adapted to receive vice clamp means 52, 53 therein, respectively and serve to secure the desired work piece 16 in secure surface-to-surface engagement with body member 40 while seated upon the upper surface 49 of support member or ledge 47. When handling the so-called softer woods such as white pine, fir and the like, a suitable non-abrasive pad 54 may be attached to the work piece engaging surface 55 of each vise clamp 52, 53 by cement or other suitable adhesive as shown in FIGS. 3 and 5.

Each vise clamp, for example, vice clamp 52 comprises a first and second body member 56, 57 which are movable longitudinally relative to each other to accommodate varying widths of workpiece 16 and are lockable relative to each other by means of lock nut 58 when the desired dimension is obtained.

In one practice of the present invention, a counterweight assembly 60 is mounted at each end of body member 40 and functions to facilitate the vertical adjustment of support member 47 relative to body member 40. Counter weight assembly 60 comprises an anchor means 61 seated in support member 47 and a flexible cable or rope 62 secured thereto and extending therefrom upwardly and reeved through a suitable pulley 63 suitably mounted for operative rotation adjacent the top of the end of member 40 and attached, at its distal end, to suitable counterweight 64.

To mount workboard sub-assembly 14 into frame sub-assembly 12, body member 40 is seated on foot member 33, 34 in optional arches 65, 66 so that the rear surface 67 thereof essentially obtains surface-to-surface contact with vertical supports 25, 26 and body member 40 is then suitably secured to supports 25, 26 as by recessed bolts (not shown). Slots 41, 42, 43 and 44 and channels 45, 46 are preferably cut in member 40 prior to this assembly. Pulley 63 is mounted on one or both ends of body member 40 and cable 62 is reeved through the corresponding pulley 63 and a counterweight 64 is attached thereto. Support member 47 is then secured to body member 40 by tightening locking device 50, 51 which extend through slots 41, 44. The turn screw 68 of each locking clamp 50, 51 is then threaded and extends through both support member 47 and body member 40 into threaded engagement with bolt 69.

Counterweight 64, having a suitable cable 62 attached thereto, may be also is mounted by reeving cable 62 through pulley 63 and anchoring the free lead end of cable 62 to anchor means 61 which is secured to support member 47. In a preferred practice, a counterweight 60 will be so installed at each end of body member 40 as it is found to greatly ease the effort required to move support member 47 relative to body member 40 when locking devices 51, 51 are loosened to permit free vertical movement in slots 41 and 44.

To join the workboard sub-assembly 14 and the frame sub-assembly 12, the workboard sub-assembly 14 is placed within the frame sub-assembly and slid to the rear until surface 67 engages vertical leg members 25, 26 as previously described. Suitable openings are then drilled through body member 40 and the corresponding vertical leg members 25, 26 and recessed bolts (not shown) are passed through these openings to secure member 40 to legs 25, 26 thereby integrally securing sub-assemblies 12 and 14 to each other. Next, rails 21, 22 are aligned with body member 40 and to assure that top edge 71 of member 40 and rails 21, 22 are parallel to each other. When properly assembled, the horizontal plane defined by rails 21, 22 will extend perpendicular to the vertical plane defined by the front surface 48 of body member 40.

It should be noted that the structure of frame sub-assembly 12 can be created With any suitable structural material such as aluminum tubing, pipe and the like and the external surfaces thereof can be either flat or curved depending upon the availability of materials. In a like manner, when rails 21, 22 are extruded as rectangular stock, the upper cone and surface 36 of the various vertical leg members 23, 24, 25 and 26 can be eliminated, it being intended that the upper surface 36 of leg members 23, 24, 25, 26 complement the contour of the corresponding rail mounted thereupon for supporting engagement therewith and will be curvilinear only when rails 21, 22 are round.

Figure 2:
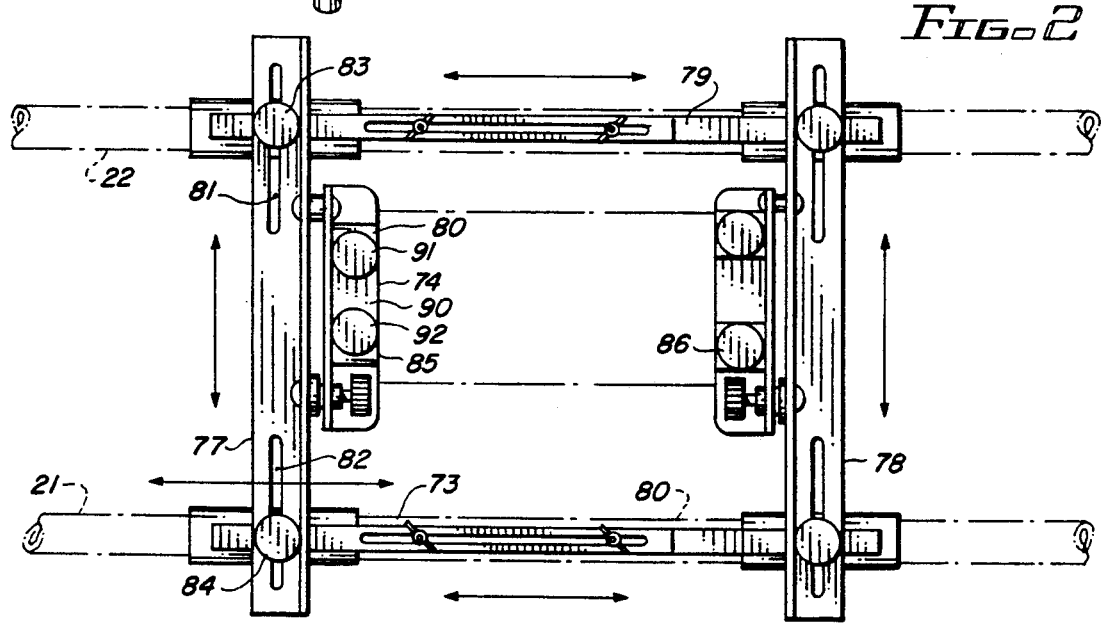
FIG. 2 is a plan view of the wood working assembly of FIG. 1 with a planer jig mounted therewith.

Referring now to FIGS. 1 and 2 tool holder or jig 18 comprises a generally rectangular expandable frame 73 having means 74 operatively associated therewith for securing a suitable handtool 75 such as a planer or a router thereto.

More particularly as shown in FIGS. 2, 3 and 5, frame 73 comprises a first and a second cross member 77, 78, each of which is secured at each end to first and second longitudinally adjustable side bars 79, 80. Each cross member for instance member 77 has first and second slots 81, 82 defined therein and axially thereof for coaction with turn bolts 83, 84 which respectively extend through slots 81, 82 into side bars 79, 80 so that when turn bolts 83, 84 are loosened, cross member 77 can be slid laterally across side members 79, 80 to orient tool holder means 74, and hence the tool 75 secured therewithin, relative to the work piece 16 disposed therebeneath.

Cross members 78, 78 are then secured in the preselected location relative to work piece 16 by turnbolts 83, 84. Of course, the same adjustment is made to position cross member 78.

Tool support means 74 as shown in FIGS. 1 and 2 comprises first and second tool support boxes 85, 86 which are secured one to each cross member 77, 78 and extend inwardly therefrom. Support boxes 85, 86 receive and secure opposite ends of hand tool 75 therein to seat and control hand tool 75 during the use of assembly 12 as will be hereinafter more fully described.

As shown in FIGS. 2 and 3, each support box, for example box 85, comprises a generally rectangular housing so having a base plate 89 for receiving handtool 75 in seated engagement thereupon. An upper member 90 is disposed in spaced generally parallel relationship to baseplate 89 and has a first and second turn screw 91, 92, operatively threaded therethrough and extendable for engagement With handtool 75 when handtool 75 is properly inserted into and seated in box 85 to secure the handtool 75 thereto. The opposite end of handtool 75 is secured into identical box 86 in the same manner.

Tool support boxes 85, 86 are provided with lateral movement on cross members 81, 82 to facilitate the alignment of the tool cutter with the precise portion of work piece 16 which is to be shaped, cut, or otherwise contoured.

Channel means 93 are mounted on tool holder 74 adjacent one edge 94 thereof and include adjustable locking means 95 which when loose, permit tool holder 74 to rotate about pivot point 96 defined adjacent the other edge 97 thereof to allow the hand tool 75 at an angle relative to cross member 77 to enable bevels and like non-orthogonal forming operations to be accomplished when desired.

Figure 8:
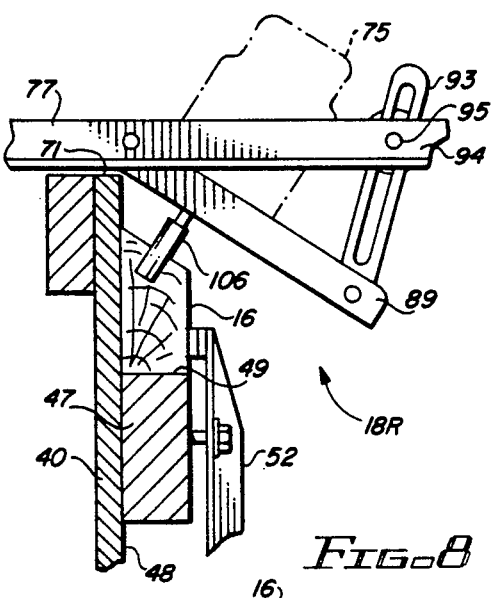
FIG. 8 is an end view of a router and rooter jig in operative association with the woodworking assembly of the present invention.
Figure 10:
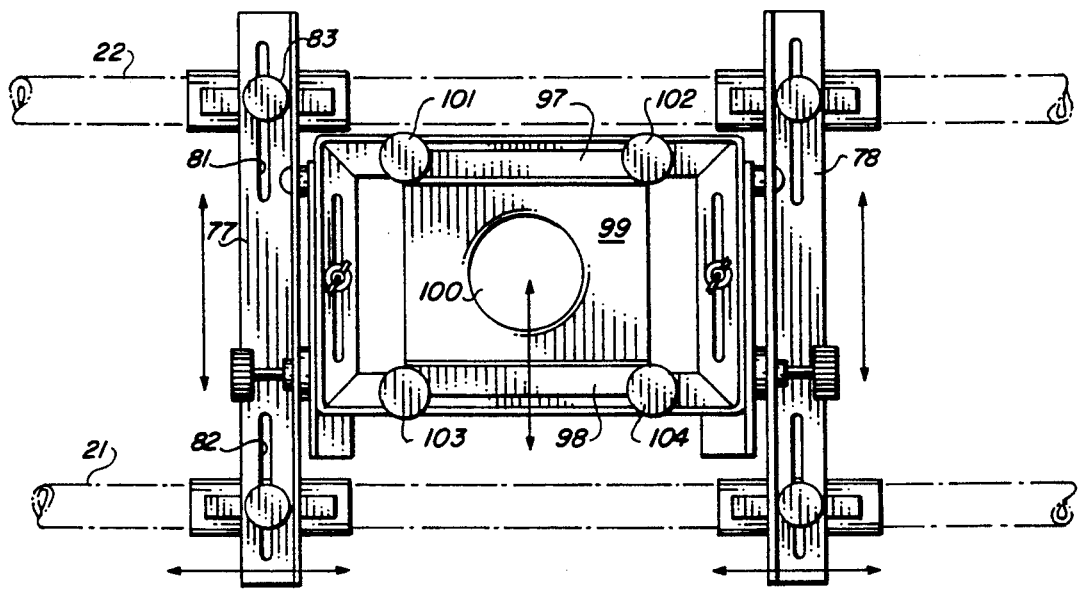
FIG. 10 is a plan view of a router jig mounted for use upon the woodworking assembly of the present invention.

An alternate jig 18, as shown in FIGS. 8 and 10, is especially adapted for use with a router. In this alternate, tool support boxes 85, 86, are replaced by adjustable side clamps 97, 98 and a base plate 99 so that having an opening 100 defined therethrough. In use, the router 75 is seated upon the base plate 99 so that its cutting member extends through opening 100. Clamps 97, 98 are tightened as by turning screws 101, 102, 103, and 104 to secure the router 75 in place. The same lateral and angular adjustment features described for the planer jig above are present in this jig as well.

Figure 7:
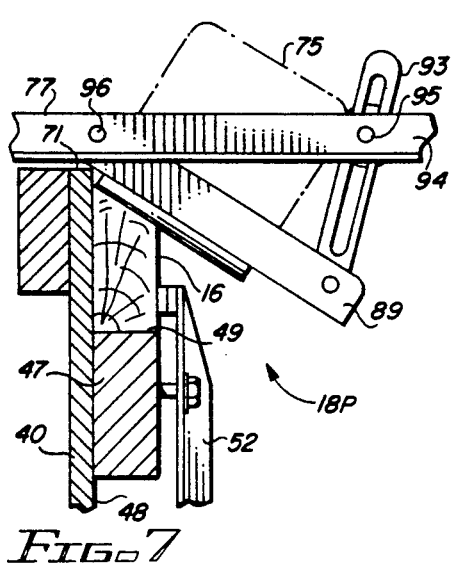
FIG. 7 is an end view of a planer and planer jig in operative association with the present invention.

Referring now to FIGS. 7, 8 and 9, the utilization of the woodworking assembly of the present invention to produce a 45° rabbet will now be described.

Figure 9A:
FIG. 9 (A through E) is a showing of the steps involved to form a 45° rabbet using the woodworking assembly of the present invention.

A preselected work piece 16 is placed upon support surface 49 of support ledge 47 and clamped in place by tightening lock nut 58 of vise clamp 52. Where work piece 16 extends the length of ledge 47, vise clamp 53 will likewise be tightened to secure work piece 16 in place which presently appears as shown in FIG. 9A.

Next adjustable locking means 95 of channel means 93 is loosened and the channel 93 relocated relative to locking means 95 until baseplate 89 is pivoted around pivot point 96 until the desired angle, in this case 45°, is defined between baseplate 89 and crossmember 77.

Figure 9B:
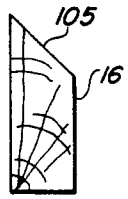

With the planer operating, clamps 50, 51 are loosened and ledge 47 is raised by pressing on counterweight 64 until work piece 16 is engaged and shaped by the plane. The elevation of work piece 16 by means of the counterweight assembly 60 continues until the desired surface 105 is formed as shown in FIG. 9B.

For purpose of this illustration, two such work pieces 16 are planed to 45°.

Figure 9C:
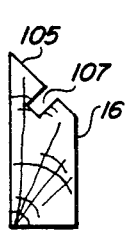

Next the planer jig 18P is removed and the router jig 18R mounted as tool support means as shown in FIG. 8. A suitable router bit 106 is then installed in the router and the tool support means 18 is adjusted as before until the longitudinal axis of bit 106 is disposed generally perpendicular to the new planed surface of work piece 16 and an appropriate hole 107 is produced in both work pieces as shown in FIG. 9C.

Figures 9D, 9E:
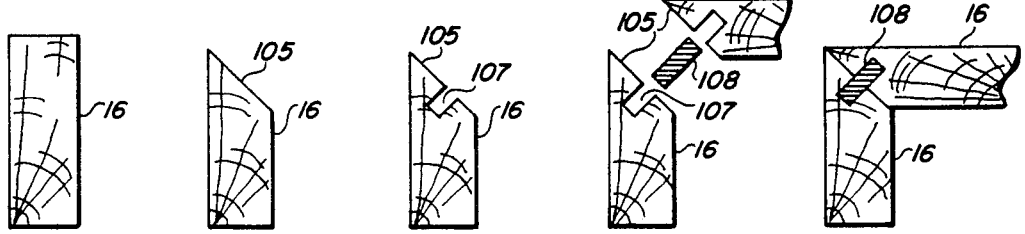

The two work pieces are then turned so that their respective finished surfaces 105 are facing each other and the holes 107 defined therein are in registry with each other. A complementarily shaped dowel 108 is then disposed in alignment in each hole 107 as shown in FIG. 9D, and the work piece 16 are pressed together on the dowel 108 to complete the joint as shown in FIG. 9E.

From the foregoing, it is readily apparent that a useful embodiment of the present invention has been herein described and illustrated which fulfills all of the aforestated objectives in a remarkably unexpected fashion. It is of course understood that such modification, alterations and adaptations as may readily occur to the artisan confronted with this disclosure are intended within the spirit of this disclosure which is limited only by the scope of the claims appended hereto.

Accordingly, what is claimed is:

1. A wood working assembly comprising a frame sub-assembly having a first and a second longitudinal rail member disposed in spaced parallel coplaner relationship to each other, and support means operatively associated with said first and said second rail members and depending therefrom for stable engagement with the ground; a work board sub-assembly operatively associated with said frame sub-assembly and including means for supporting a wooden work piece thereon and means for preselectively adjusting said work piece relative to said rail members; and tool support means adapted to support a portable power tool thereupon while simultaneously engaging each of said rail members, said tool support means being manually traversable on said rail members relative to said work piece to enable said work piece to be shaped in response to the action of said power tool.

2. A woodworking assembly according to claim 1 in which said support means comprises a first and a second leg member depending from each said rail member and a first and second foot member, each said foot member disposed in spaced transverse relationship to said rail members and having a first and a second base stem mounted thereupon for receiving a corresponding leg member in lockable telescopic relationship therewithin.

3. A woodworking assembly according to claim 2 in which each of said leg members has an upper surface defined thereupon adapted to engage a portion of said rail member in intimate surface-to-surface engagement therewith.

4. A woodworking assembly according to claim 1 in which said workboard subassembly comprises: a rectangular body member adapted for secure attachment to said frame subassembly, a plurality of vertically extending slots defined in said body member in spaced generally parallel relationship with each other to define an interior pair of slots and an exterior pair of slots, a pair of clamp members, an elongated support ledge extending transversely of said body member and secured thereto by said clamp members, each of said clamp members extending through said support ledge into operative association with a different one of said exterior pair of vertically extending slots.

5. A woodworking assembly according to claim 4 in which a first and second vise clamp is mounted in a different one of said interior pair of slot members beneath said support ledge and coacts therewith to secure a work piece on to said support ledge.

6. A woodworking assembly according to claim 2 in which said workboard subassembly comprises: a rectangular body member adapted for secure attachment to said frame subassembly, a plurality of vertically extending slots defined in said body member in spaced generally parallel relationship with each other to define an interior pair of slots and an exterior pair of slots, a pair of clamp members, an elongated support ledge extending transversely of said body member and secured thereto by said clamp members, each of said clamp members extending through said support ledge into operative association with a different one of said exterior pair of vertically extending slots.

7. A woodworking assembly according to claim 6 in which a first and second vise clamp is mounted in a different one of said interior pair of slot members beneath said support ledge and coacts therewith to secure a work piece on to said support ledge.

8. A woodworking assembly according to claim 3 in which said workboard subassembly comprises: a rectangular body member adapted for secure attachment to said frame subassembly, a plurality of vertically extending slots defined in said body member in spaced generally parallel relationship with each other to define an interior pair of slots and an exterior pair of slots, a pair of clamp members, an elongated support ledge extending transversely of said body member and secured thereto by said clamp members, each of said clamp members extending through said support ledge into operative association with a different one of said exterior pair of vertically extending slots.

9. A woodworking assembly according to claim 8 in which said workboard subassembly comprises: a rectangular body member adapted for secure attachment to said frame subassembly, a plurality of vertically extending slots defined in said body member in spaced generally parallel relationship with each other to define an interior pair of slots and an exterior pair of slots, a pair of clamp members, an elongated support ledge extending transversely of said body member and secured thereto by said clamp members, each of said clamp members extending through said support ledge into operative association with a different one of said exterior pair of vertically extending slots.

10. A woodworking assembly according to claim 1 in which said tool support means comprises a first and a second cross member disposed in spaced generally parallel relationship to each other, a first and a second side bar, each disposed upon a different one of said rail members and in orthogonal connecting relationship to said cross members, said cross members have means for securing a portable hand tool thereto in operative relationship to said work board sub assembly.

11. A woodworking assembly according to claim 10 in which said tool support means includes a base plate for supporting said hand tool, said base plate being selectively adjustable relative to said crossmembers to define an angle relative thereto.

12. A woodworking assembly according to claim 2 in which said tool support means comprises a first and a second cross member disposed in spaced generally parallel relationship to each other, a first and a second side bar, each disposed upon a different one of said rail members and in orthogonal connecting relationship to said cross members, said cross members have means for securing a portable hand tool thereto in operative relationship to said work board sub assembly.

13. A woodworking assembly according to claim 12 in which said tool support means includes a base plate for supporting said hand tool, said base plate being selectively adjustable relative to said crossmembers to define an angle relative thereto.

14. A woodworking assembly according to claim 3 in which said tool support means comprises a first and a second cross member disposed in spaced generally parallel relationship to each other, a first and a second side bar, each disposed upon a different one of said rail members and in orthogonal connecting relationship to said cross members, said cross members have means for securing a portable hand tool thereto in operative relationship to said work board sub assembly.

15. A woodworking assembly according to claim 14 in which said tool support means includes a base plate for supporting said hand tool, said base plate being selectively adjustable relative to said crossmembers to define an angle relative thereto.

16. A woodworking assembly according to claim 4 in which said tool support means comprises a first and a second cross member disposed in spaced generally parallel relationship to each other, a first and a second side bar, each disposed upon a different one of said rail members and in orthogonal connecting relationship to said cross members, said cross members have means for securing a portable hand tool thereto in operative relationship to said work board sub assembly.

17. A woodworking assembly according to claim 16 in which said tool support means includes a base plate for supporting said hand tool, said base plate being selectively adjustable relative to said crossmembers to define an angle relative thereto.

18. A woodworking assembly according to claim 5 in which said tool support means comprises a first and a second cross member disposed in spaced generally parallel relationship to each other, a first and a second side bar, each disposed upon a different one of said rail members and in orthogonal connecting relationship to said cross members, said cross members have means for securing a portable hand tool thereto in operative relationship to said work board sub assembly.

19. A woodworking assembly according to claim 18 in which said tool support means includes a base plate for supporting said hand tool, said base plate being selectively adjustable relative to said crossmembers to define an angle relative thereto.

20. A woodworking assembly according to claim 6 in which said tool support means comprises a first and a second cross member disposed in spaced generally parallel relationship to each other, a first and a second side bar, each disposed upon a different one of said rail members and in orthogonal connecting relationship to said cross members, said cross members have means for securing a portable hand tool thereto in operative relationship to said work board sub assembly.

21. A woodworking assembly according to claim 20 in which said tool support means includes a base plate for supporting said hand tool, said base plate being selectively adjustable relative to said crossmembers to define an angle relative thereto.

22. A woodworking assembly according to claim 7 in which said tool support means comprises a first and a second cross member disposed in spaced generally parallel relationship to each other, a first and a second side bar, each disposed upon a different one of said rail members and in orthogonal connecting relationship to said cross members, said cross members have means for securing a portable hand tool thereto in operative relationship to said work board sub assembly.

23. A woodworking assembly according to claim 22 in which said tool support means includes a base plate for supporting said hand tool, said base plate being selectively adjustable relative to said crossmembers to define an angle relative thereto.

24. A woodworking assembly according to claim 8 in which said tool support means comprises a first and a second cross member disposed in spaced generally parallel relationship to each other, a first and a second side bar, each disposed upon a different one of said rail members and in orthogonal connecting relationship to said cross members, said cross members have means for securing a portable hand tool thereto in operative relationship to said work board sub assembly.

25. A woodworking assembly according to claim 24 in which said tool support means includes a base plate for supporting said hand tool, said base plate being selectively adjustable relative to said crossmembers to define an angle relative thereto.

26. A woodworking assembly according to claim 9 in which said tool support means comprises a first and a second cross member disposed in spaced generally parallel relationship to each other, a first and a second side bar, each disposed upon a different one of said rail members and in orthogonal connecting relationship to said cross members, said cross members have means for securing a portable hand tool thereto in operative relationship to said work board sub assembly.

27. A woodworking assembly according to claim 26 in which said tool support means includes a base plate for supporting said hand tool, said base plate being selectively adjustable relative to said crossmembers to define an angle relative thereto.

28. A woodworking assembly according to claim 27 having a counterweight assembly comprising anchor means, pulley means, cable means and a counter weight, said anchor means being firmly secured to said body member adjacent said support ledge, said pulley means being mounted to said body member superposed to said support ledge; said counterweight being secured to said cable means; and said cable means being reamed through said pulley means and attached to said anchor means.

* * * * *